United States Patent [19]

Lewis et al.

[11] Patent Number: 6,005,865
[45] Date of Patent: Dec. 21, 1999

[54] OPTICAL NETWORK UNIT FOR COMMUNICATING TELEPHONY AND VIDEO INFORMATION

[75] Inventors: Stephen Lewis, Napa; K. Martin Stevenson, III, San Rafael; Farzad S. Nabavi, Union City; Catherine A. Millet; Jason Dove, both of Petaluma, all of Calif.

[73] Assignee: Alcatel USA Sourcing, L.P., Plano, Tex.

[21] Appl. No.: 08/978,969

[22] Filed: Nov. 26, 1997

Related U.S. Application Data

[60] Provisional application No. 60/031,896, Nov. 27, 1996.

[51] Int. Cl.$^6$ .................................................. H04L 12/56
[52] U.S. Cl. ........................... 370/398; 370/474; 370/529
[58] Field of Search .................................... 370/395, 396, 370/398, 412, 413, 415, 417, 474, 527, 529, 905, 907, 468, 493, 494, 495; 348/6, 7, 14, 16; 359/118, 123, 125, 128, 135, 137

[56] References Cited

U.S. PATENT DOCUMENTS

| | | | |
|---|---|---|---|
| 5,115,429 | 5/1992 | Hluchyj et al. | 370/231 |
| 5,555,244 | 9/1996 | Gupta et al. | 370/60.1 |
| 5,608,447 | 3/1997 | Farry et al. | 348/7 |
| 5,619,498 | 4/1997 | Sharpe | 370/396 |
| 5,677,905 | 10/1997 | Bigham et al. | 340/825.06 |
| 5,687,014 | 11/1997 | Czerwiec et al. | 359/123 |
| 5,740,075 | 4/1998 | Bigham et al. | 395/200.59 |
| 5,754,941 | 5/1998 | Sharpe et al. | 455/5.1 |
| 5,781,320 | 7/1998 | Byers | 359/123 |
| 5,790,173 | 8/1998 | Strauss et al. | 348/7 |
| 5,809,022 | 9/1998 | Byers et al. | 370/395 |

FOREIGN PATENT DOCUMENTS

| | | | |
|---|---|---|---|
| 0713347 | 5/1996 | European Pat. Off. | H04Q 11/04 |
| 9532596 | 11/1995 | WIPO | H04Q 11/04 |

OTHER PUBLICATIONS

Vickers, et al., "The Role of SDH and ATM in Broadband Access Networks", IEEE, vol. 1, Dec., 1991, pp. 212–216.

Amin–Salehi, et al., "Network Architectures for Digital Video Delivery Service in Mid–1990s", IEEE, vol. 3, vol. 4, Jun., 1992, pp. 1758–1762.

Auer, et al., "Wirtschaftliches Breitband–Tuning fuer das Kupfernetz", Telcom Report, vol. 19, No. 4, 1996, pp. 34–37.

*Primary Examiner*—Chi H. Pham
*Assistant Examiner*—Kwang B. Yao
*Attorney, Agent, or Firm*—Baker & Botts, L.L.P.

[57] ABSTRACT

A telephone and video telecommunications distribution network (10) includes a telecommunications switch (12) and an optical network unit configuration (20*b*). The telecommunications switch (12) receives telephony traffic at a common control section (14) and video information at a video bank section (18). The video bank section receives telephony traffic from the common control section (14) and places the telephony traffic into telephony ATM cells. Video information is carried in video ATM cells. The Video Dank section (18) multiplexes telephony ATM cells and video ATM cells onto a fiber optic communication link for transport to the optical network unit configuration (20*b*). The optical network unit configuration (20*b*) includes a full service optical line unit (80) that segregates telephony ATM cells from video ATM cells. The full service optical line unit (80) transfers video ATM cells to a video brick (31) for processing. The full service optical line unit extracts telephony traffic from the telephony ATM cells for transport to a conventional optical network unit (82).

7 Claims, 8 Drawing Sheets

OPTICAL NETWORK UNIT FOR COMMUNICATING TELEPHONY AND VIDEO INFORMATION

CROSS REFERENCE TO RELATED APPLICATIONS

This application claims the benefit of U.S. Provisional Application No. 60/031,896 filed on Nov. 27, 1996.

TECHNICAL FIELD OF THE INVENTION

The present invention relates in general to telecommunications networks and more particularly to an optical network unit for communicating telephony and video information.

BACKGROUND OF THE INVENTION

Over the past decade, telephone companies have been confronted with increasing competition for their core businesses. Revenues from telephone services are either flat or in a declining state. In order to improve profit margins, telephone companies have dramatically reduced staff levels and diversified their businesses to reduce their reliance on telephone service profits. Telephone companies desire to expand revenue opportunities through the offering of new services. The most significant new service with respect to the residential customer is the delivery of video services such as analog multicast, digital multicast, and switched digital capabilities. Telephone companies look to gain a share of the cable television and video cassette rental revenue streams and to grow the total available market through successful marketing and distribution of new on-demand video services. Therefore, it is desirable that video services can be provided by telephone companies along with telephony services that are currently offered.

SUMMARY OF THE INVENTION

From the foregoing, it may be appreciated that a need has arisen for the ability to integrate telephony and video information for transport through a telecommunications network. In accordance with the present invention, an optical network unit for communicating telephony and video information is provided that substantially eliminates or reduces disadvantages and problems associated with conventional bifurcated telephony and video processing.

According to an embodiment of the present invention, there is provided an optical network unit for communicating telephony and video information that includes an optical line unit operable to receive, in the downstream direction, telephony traffic and video information carried in asynchronous transfer mode cells. The optical line unit identifies asynchronous transfer mode cells carrying telephony traffic, extracts the telephony traffic from the asynchronous transfer mode cells, and routes the telephony traffic for conventional telephony processing. The optical line unit also identifies asynchronous transfer mode cells carrying video information and routes these video asynchronous transfer mode cells for video processing. In the upstream direction, the optical line unit receives telephony traffic for placement into asynchronous transfer mode cells. The optical line unit also receives asynchronous transfer mode cells carrying video control information for multiplexing with the telephony asynchronous transfer mode cells and transfer out of the optical line unit.

The present invention provides various technical advantages over conventional bifurcated telephony and video processing. For example, one technical advantage is to integrate the delivery of telephony traffic and video information. Another technical advantage is the ability to provide both telephony and full motion video over a telecommunications network. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
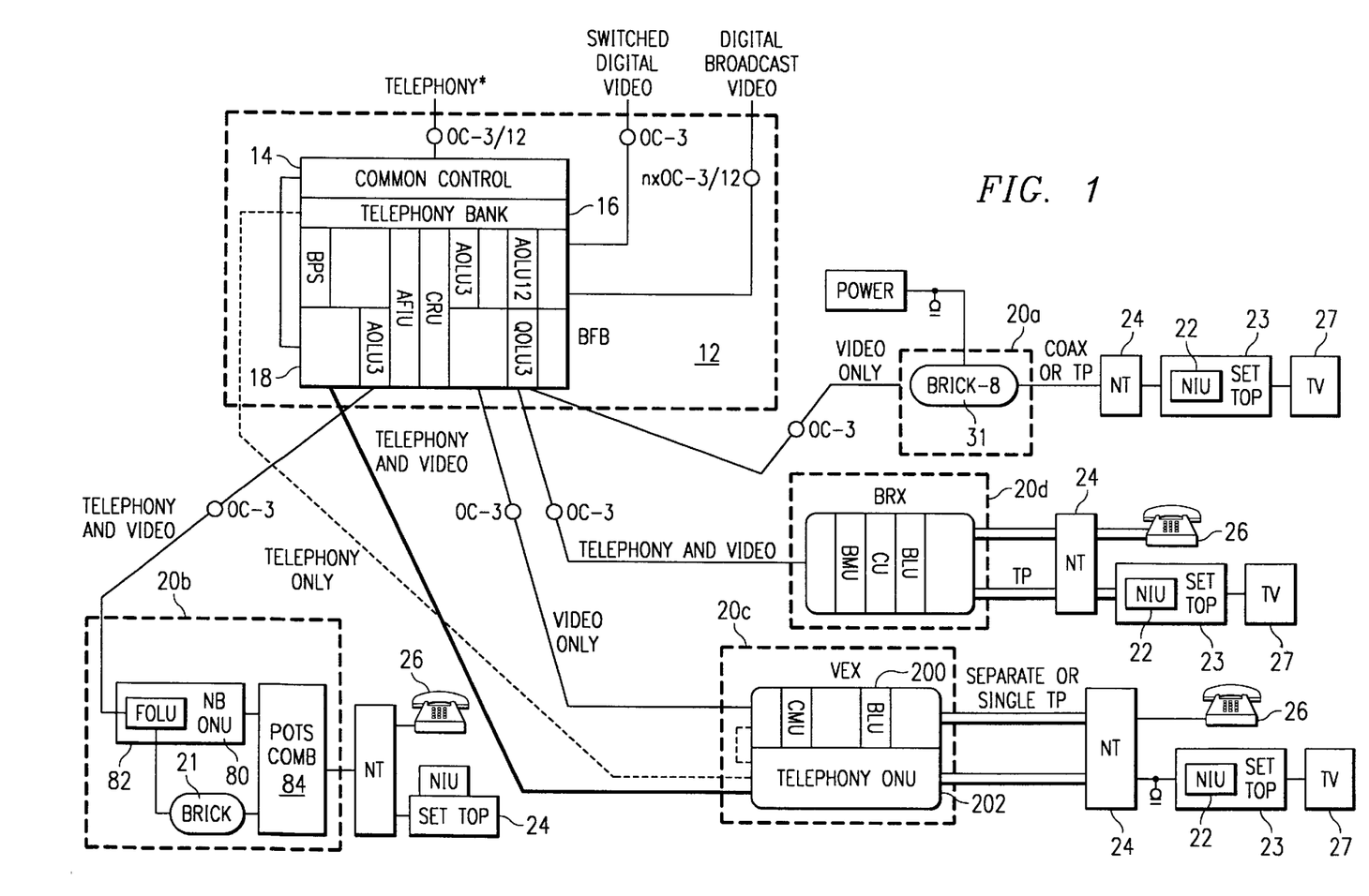
FIG. 1 illustrates a block diagram of a telephony and video telecommunications distribution network.

FIG. 1 is a block diagram of a telephony and video distribution network 10. Telephony and video telecommunications distribution network 10 includes a telecommunications switching unit 12 divided into a common control section 14, a telephony bank section 16, and a video bank section 18. Telecommunications switching unit 12 may provide conventional telephony-only information transfer through common control section 14 and telephone bank 16 as typically found in conventional digital loop carrier systems. At video bank section 18, telecommunications switching unit 12 adds the capability to transfer video information along with or separate from the telephony traffic. At common control section 12, telecommunications switch unit 12 receives telephony traffic over a communications link, such as a fiber optic or other type of connection, from a central office or other telephony-based switching system. At video bank section 16, telecommunications switching unit 12 receives switched digital video information from a communication link with a stored video information provider and digital broadcast video from a communication link with a broadcast video information provider. Video bank section 16 may receive telephony traffic from common control section 14 for combination with video information and transfer to any of a variety of optical network unit configurations 20a, 20b, 20c, and 20d over fiber optic communications links. For more information on telephony and video telecommunications distribution network 10 and the operation of video bank section 18, please refer to copending U.S. patent application, Ser. Nos. 60/031,895 and 08/980,271, entitled Telecmmunications Switch for Providing Telephony Traffic Integrated with Video Information Services and Video Information, hereby incorporated herein by reference.

Optical network unit configurations 20a, 20b, 20c, and 20d provide video information to network interface units 22 within set top units 23 located within the home or business either directly or through a network termination unit 24 for display on customer premises video equipment 27 such as a television or computer monitor. Optical network unit configurations 20a, 20b, 20c, and 20d may also provide and receive traffic information to and from customer premises telephone equipment 26, such as a phone or computer, either directly or through network termination unit 24. Communication links between optical network unit configurations 20a, 20b, 20c, and 20d and customer premises telephone equipment 26 and set top units 23 may be provided by any type of conventional means including coaxial cable, twisted pair wire, and fiber optics.

Figure 2A:
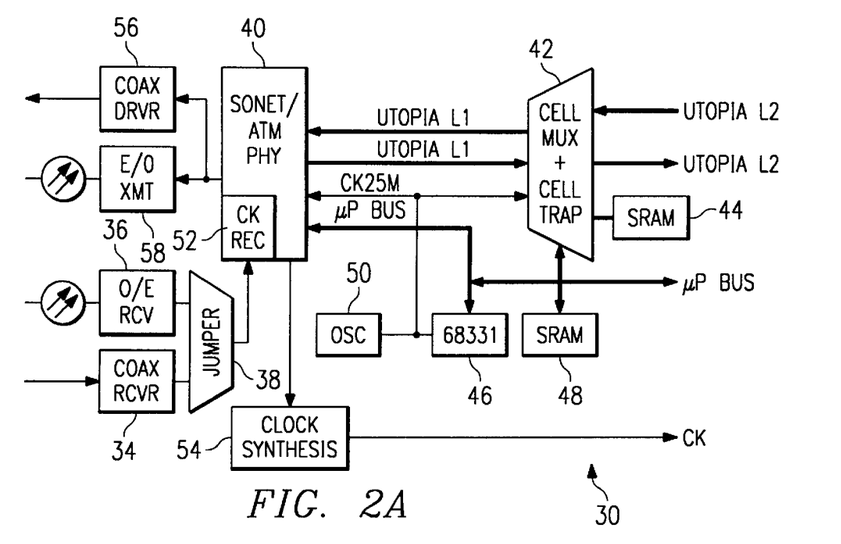
FIGS. 2A–B illustrate block diagrams of a video only optical network unit configuration.
Figure 2B:
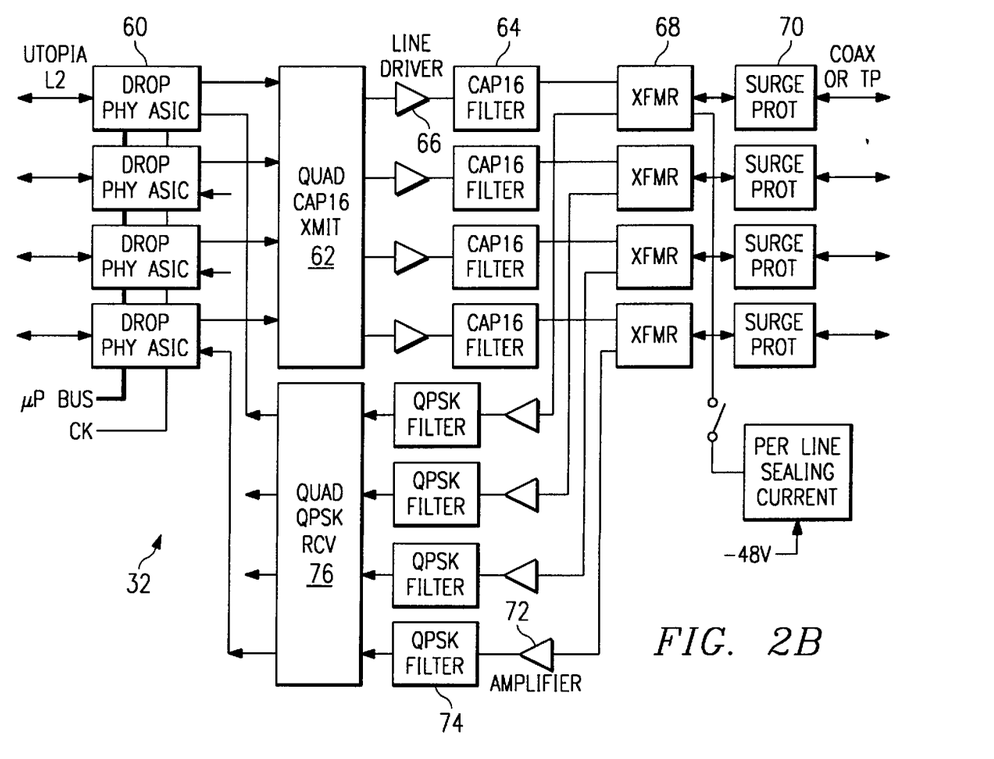

Optical network unit configuration 20a provides a separate video-only interface between telecommunications switching unit 12 and network interface unit 22. FIGS. 2A and 2B show a block diagram of optical network unit configuration 20a. Optical network unit configuration 20a includes a video brick 31 divided into a video brick motherboard 30 shown in FIG. 2A and a video brick daughterboard 32 shown in FIG. 2B. Video brick motherboard 30 preferably receives video information over either a coaxial cable input at a coax receiver 34 or an optical fiber input at an optical-to-electrical receiver 36. A jumper 38 determines which of the inputs is to be processed by video brick motherboard 30. For optical network unit configuration 20a shown, the video information is received over the optical fiber communication link from broadband fiber bank 18 at optical-to-electrical receiver 36.

Video information is preferably received at video brick motherboard 30 in asynchronous transfer mode cells (ATM) of synchronous (SONET) frames by a SONET/ATM optical network physical interface 40. SONET/ATM physical layer interface 40 processes section, line, and path overheads, and extracts video ATM cells using cell delineation. Valid video ATM cells are written into a 4-cell buffer for transfer through a Utopia level one protocol. Descrambling of video ATM cell payloads may also be performed by SONET/ATM physical layer interface 40. Video ATM cell information transferred in the Utopia level one protocol are received at a cell multiplexer 42. Cell multiplexer 42 places video ATM cell information into an appropriate queue according to the video ATM cell's destination port determined from its original path identifier field.

If video brick daughterboard 32 is ready to accept video ATM cell information stored in queues at cell multiplexer 42, video ATM cell information is forwarded immediately, otherwise, video ATM cell information is stored in a dedicated external static random access memory 44 until video brick daughterboard 32 is ready to accept them. Video ATM cell information may include control information destined for a microprocessor 46 that controls operation of video brick motherboard 30. Cell multiplexer 42 requests a bus from microprocessor 46 and sends the video ATM cell control information destined for microprocessor 46 to its static random access memory 48 over the requested bus. Cell multiplexer 42 may also trap certain video ATM cell information that includes maintenance information for processing by microprocessor 46. An external oscillator 50 provides an appropriate clock signal for microprocessor 46, SONET/ATM physical layer interface 40, and cell multiplexer 42. Video brick motherboard 30 also includes a clock recovery unit 52 and a clock synthesizer 54 to provide clock signals in response to the incoming video information and to handle jitter and synchronization.

In the upstream direction, cell multiplexer 42 receives video ATM cell information from video brick daughterboard 32 in the Utopia level two protocol through a round robin polling routine of various ports. Cell multiplexer 42 multiplexes video ATM cell information from the various ports and delivers video ATM cell information received from video brick daughterboard 32 to SONET/ATM physical layer interface 40 over the Utopia level one protocol. Cell multiplexer 42 may also transfer video ATM cell information to SONET/ATM physical layer interface 40 from random access memory 48 generated by microprocessor 46. SONET/ATM physical layer interface 40 receives video ATM cell information in the Utopia level one protocol and places video ATM cell information into a 4-cell buffer. Idle ATM cells are automatically inserted when the 4-cell buffer contains fewer than four cells. The header check sequence is generated and the video ATM cell information may be optionally scrambled. SONET/ATM physical layer interface 40 places the video ATM cell information into video Atm cells of SONET frames for transfer onto either a coaxial cable, through a coaxial driver 56, or an optical fiber communication link, through an electrical to optical transmitter 58.

At video brick daughterboard 32, cells are received over the utopia level two protocol from cell multiplexer 42 of video brick motherboard 30 at a drop physical layer interface 60. Drop physical layer interface 60 buffers the video Atm cell information, generates and processes header bytes contained in the data framing, and maps the video ATM cell information into continuous frames. Drop physical layer interface 60 performs mapping of video ATM cell information and header bytes through payload and header randomizing and Reed-Solomon encoding. A CAP-16 transmitter 62 takes the serial data and clocking from drop physical layer interface 60 and formats the serial data into a 16-point CAP symbol differential code. After digital-to-analog conversion, CAP-16 transmitter 62 transfers this code, with appropriate clocking, to a CAP-16 filter 64 through a line driver 66 before sending the signals downstream through isolation transformer 68. A surge protection interface 70 is provided to prevent any foreign voltages on the line from damaging the circuitry.

In the upstream direction, serial data proceeds through surge protector 70, isolation transformer 68, and is enhanced by an amplifier 72. After amplification, serial data is filtered by a quaternary phase shift keying (QPSK) filter 74 and converted into bits by a QPSK receiver 76. QPSK receiver 76 determines bit timing, carrier synchronization, and frame pattern decoding by identifying a specific preamble bit sequence and appending a trailer byte. QPSK receiver 76 passes the data, without preamble and trailer, to drop physical layer interface 60. Drop physical interface 60 performs cell delineation by framing received data to ATM cell boundaries and forwards the video ATM cell information through buffering to cell multiplexer 42 of video brick motherboard 30 in a Utopia level 2 protocol. Drop physical layer interface 60 performs Reed-Solomon decoding and derandomizing prior to cell delineation.

Video brick 31 preferably provides eight broadband video drops for video service provision to customers. The main applications of video brick 31 include video expansion for smaller telephony optical line unit configurations and video overlay to existing telephone plant in less densely populated areas. Video brick 31 preferably couples to the home using a coaxial cable connection with exemplary information rates including 51.84 Mb/sec downstream and 1.62 Mb/sec upstream rates demultiplexed from an incoming 155.52 Mb/sec bit stream from video bank section 18, though twisted pair and fiber optic connections are also possible.

With the transceiver and physical layer functions both on video brick daughterboard 32, different transceiver technologies and associated physical layer interfaces can be accommodated for through removal and installation only of video brick daughterboard 32.

Video brick 31 of optical network unit configuration 20a is also used as part of optical network unit configuration 20b. Optical network configuration 20b takes a conventional narrowband telephony-only optical network unit 80 and adds a full service optical line unit 82 that interfaces with video bank section 18 through a fiber optic communication link. Full service optical line unit 82 receives SONET frames containing video ATM cells and telephony ATM cells, extracts the video ATM cells and telephony ATM cells, and transfers video ATM cells to video brick 31 for processing as discussed above with respect to optical network unit configuration 20a. Full service optical line unit 82 transfers telephony ATM cells to optical network unit 80 for conventional telephony processing. Telephony data streams from conventional optical network unit 80 and video data streams from video brick 31 may be joined by a plain old telephone system (POTS) combiner 84 for transfer to network termination 24 and subsequent splitting to customer premises telephone equipment 26 and set top units 23, respectively.

Figure 3:
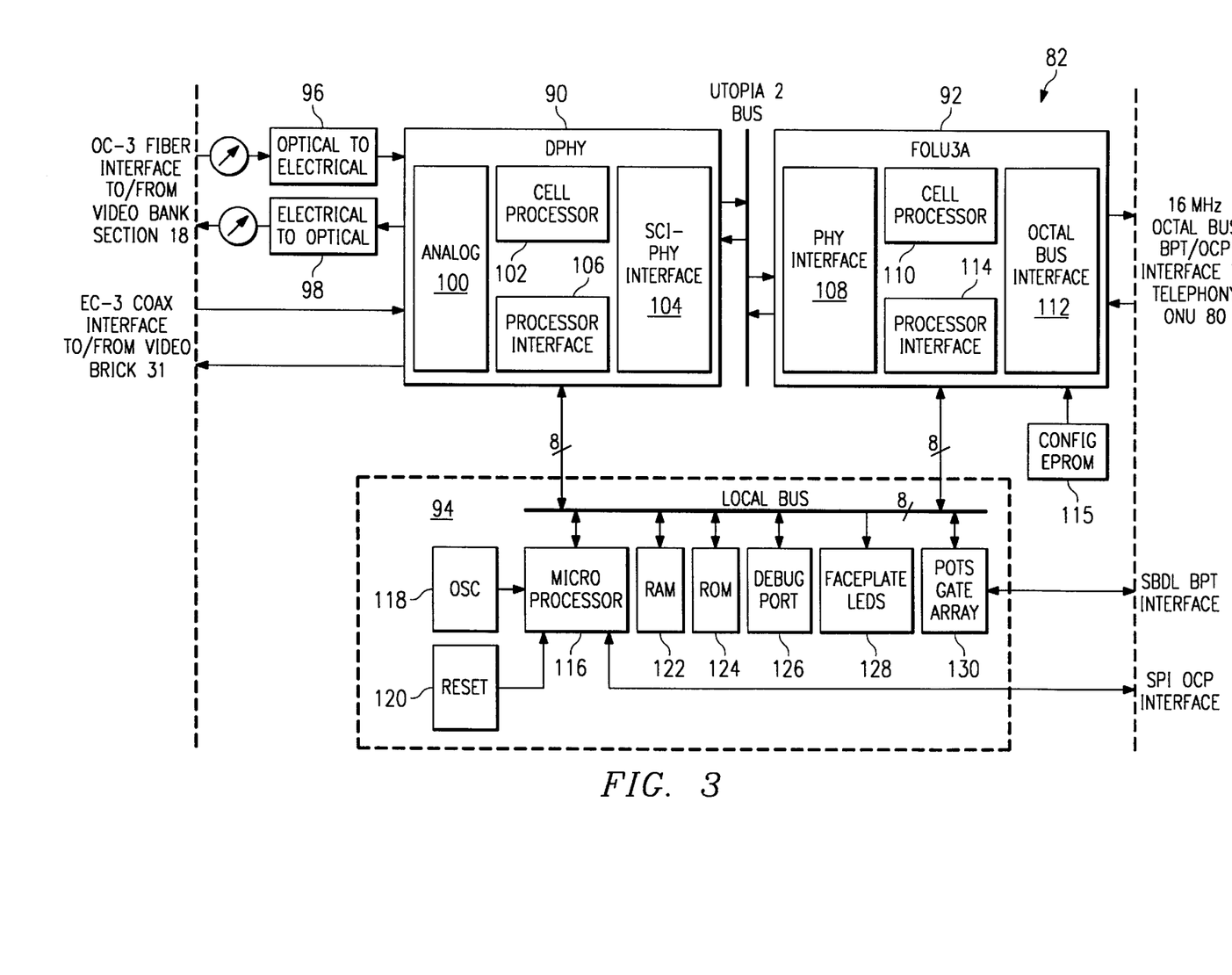
FIG. 3 illustrates an optical line unit within a video and telephony optical network unit configuration.

FIG. 3 shows a block diagram of full service optical line unit 82. Full service optical line unit 82 includes a dual SONET physical layer interface 90, a cell processing unit 92, and a control unit 94. Dual SONET physical layer interface 90 provides the input and output processing from and to video bank section 18 and video brick 31. Dual SONET physical layer interface 90 interfaces with an optical-to-electrical unit 96 and an electrical-to-optical unit 98 in order to retrieve video and telephony ATM cells from and provide video and telephony ATM cells to the optical fiber communication link with video bank section 18. Dual SONET physical layer interface 90 has a serial input/output unit 100 to communicate with optical-to-electrical unit 96 and electrical-to-optical unit 98. Serial input/output unit 100 also communicates with video brick 31 over a coaxial cable connection. A cell processor 102 performs appropriate cell and overhead processing of received and transmitted video and telephony ATM cells. A Utopia interface 104 provides the appropriate protocol conversion for communication with cell processing unit 92. A microprocessor interface 106 performs communications with controller section 94 for the transfer of control and supervisory data.

Cell processing unit 92 includes a Utopia interface 108 to convert to and from the appropriate Utopia level 2 protocol. A cell processor 110 delineates video ATM cells from telephony ATM cells and transfers the telephony ATM cells to an octal bus interface 112 for the processing of telephony traffic through conventional optical network unit functions. Video ATM cells are routed to video brick 31 through dual SONET physical layer interface 90. A processor interface 114 allows for communications between cell processing unit 92 and controller section 94 for the passage of control and supervisory data. A configuration read only memory 115 allows for programming of cell processing unit 92.

Controller section 94 operates and responds to a microprocessor 116 having a local oscillator reference source 118 and reset circuitry 120. Random access memory 122 and read only memory 124 provide the memory space for data manipulation and program control. A debug port 126 allows for external maintenance and testing of controller section 94. Control panel 128 provides appropriate operating and alarm conditions for full service optical line unit 82. POTS gate array unit 130 provides an interface between controller section 94 and conventional optical network unit 80 over a subscriber bus data link. Microprocessor 116 also interfaces with the control processor of conventional optical network unit 80 over a serial peripheral interface.

Figure 4:
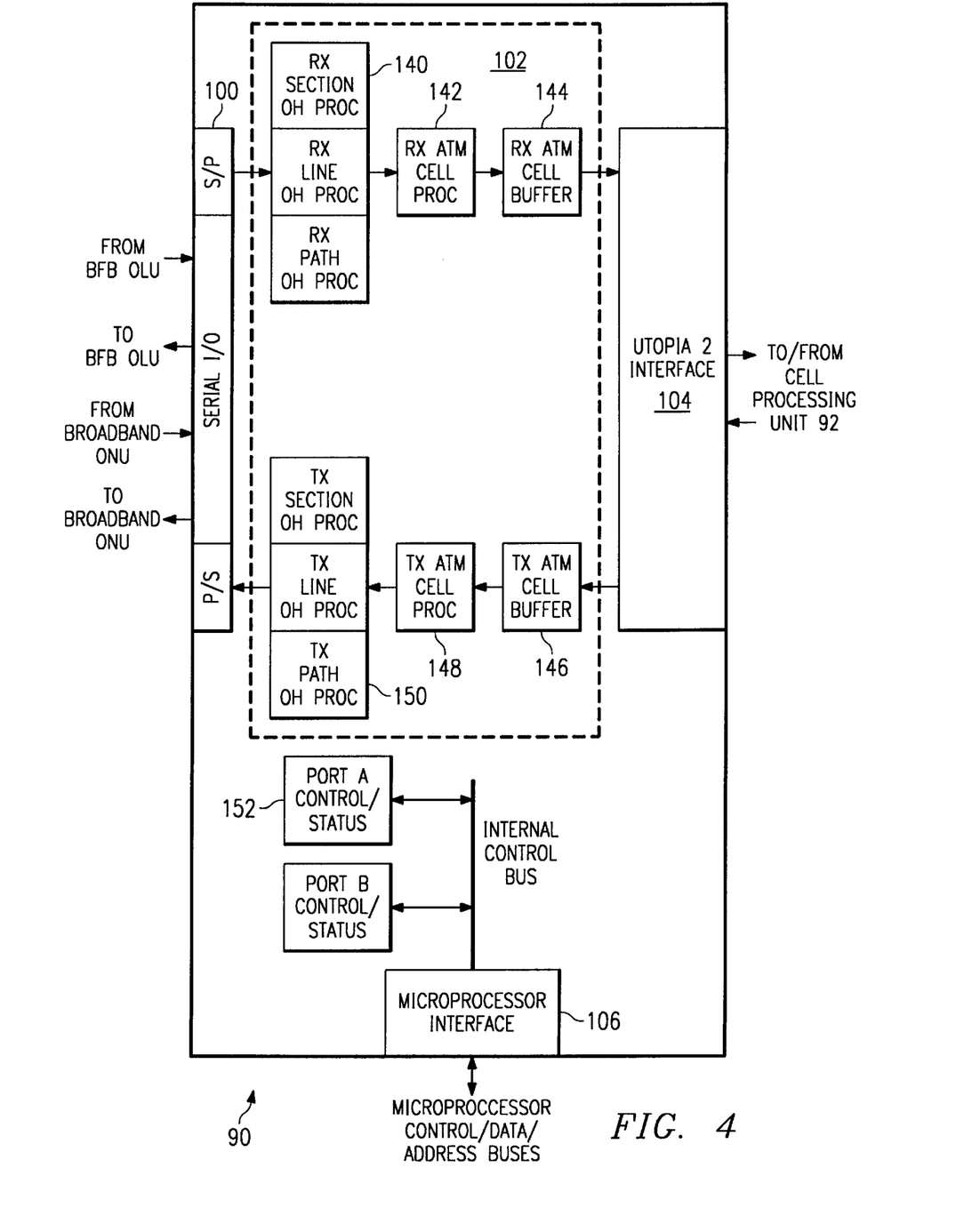
FIG. 4 illustrates a block diagram of a synchronous optical network physical layer interface for the optical line unit.

FIG. 4 is a block diagram of dual SONET physical layer interface 90. In the downstream direction, dual SONET physical layer interface 90 receives video and telephony ATM cells from video bank section 18 at serial input/output unit 100. Serial input/output unit 100 provides appropriate framing and scrambling of the video and telephony ATM cell data stream carried over the optical fiber communication link. Serial input/output unit 100 performs cell extraction, cell delineation, and idle cell discard of the data stream for conversion into a parallel format. The parallel data is passed to cell processor 102 that performs section, line, and path overhead processing of the video and telephony ATM cells at an overhead processor 140. Processing of received video and telephony ATM cells are performed by a receive cell processor 142. Video and telephony ATM cells are stored in a receive ATM cell buffer 144 prior to transmission to cell processing unit 92 through Utopia interface 104.

In the upstream direction, cells are received from cell processing unit 92 at Utopia interface 104 and stored in a transmit ATM cell buffer 146. Cell processing is performed by a transmit cell processor 148 with section, line, and path overhead processing performed by a transmit overhead processor 150. Video and telephony ATM cells are converted to serial format by serial input/output unit 100 which also inserts the video and telephony ATM cells into an STS-3 synchronous payload envelope. Serial input/output unit 100 performs framing and scrambling of video and telephony ATM cells into SONET frames for placement onto the optical fiber communication link to video bank section 18 or the coaxial cable link to video brick 31 according to the destination of the cells. Control and status information from port unit 152 is communicated over an internal control protocol bus through microprocessor interface 106 to control section 94.

Figure 5A:
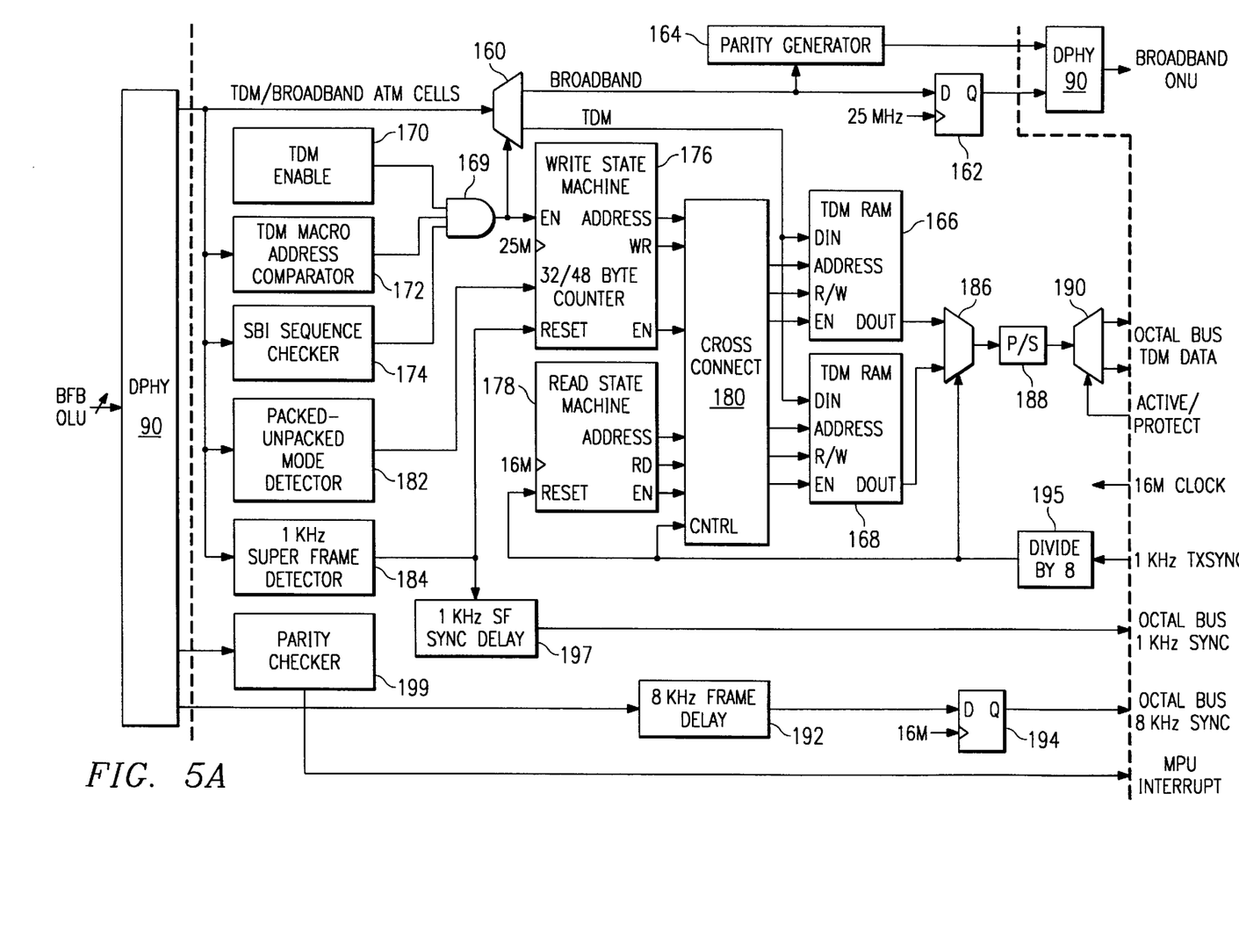
FIGS. 5A–B illustrate block diagrams of a cell processing unit in the optical line unit.
Figure 5B:
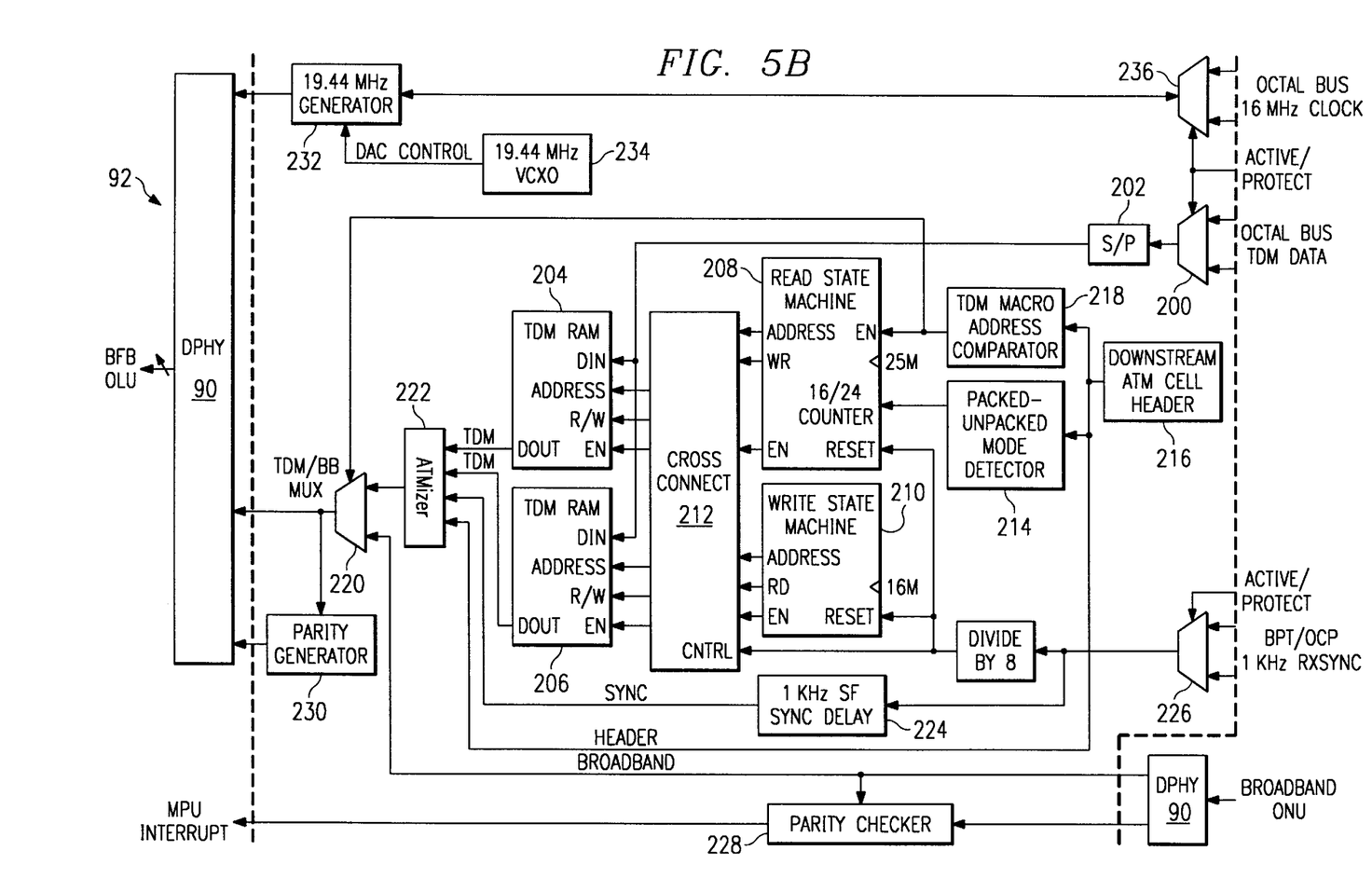

FIGS. 5A and 5B show block diagrams of cell processing unit 92 for downstream and upstream signal flow, respectively. In FIG. 5A, video and telephony ATM cells are received from dual SONET physical layer interface 90 at a demultiplexer 160. Demultiplexer 160 selectively extracts video ATM cells and telephony ATM cells from the video and telephony ATM cell data stream provided by dual SONET physical layer interface 90. Video ATM cells are latched through a flip-flop 162 for routing back through dual SONET physical layer interface 90 to video brick 31. Parity generator 164 checks for appropriate parity of the video ATM cells to ensure that valid video ATM cells have been received. Telephony ATM cells identified at demultiplexer 160 are transferred to a pair of TDM random access memories 166 and 168.

Demultiplexer 160 is controlled by an OR gate 169 with inputs received from a TDM enabler 170, a TDM macro address comparator 172, and a subscriber bus interface (SBI) sequence checker 174. TDM enabler 170 is a programmable register that controls whether downstream telephony ATM cells are allowed to be routed to conventional optical network unit 80. If not, then cell processing unit 94 operates in a broadband only mode and all cells from dual SONET physical layer interface 90 are treated as video ATM cells and passed through demultiplexer 160 for subsequent transfer to video brick 31. Video ATM cells are routed to video brick 31 once a maximum of eight subscriber bus interface (SBI) frames have been received in a single superframe 1 ms time period.

TDM macro address comparator 172 compares header information in the received video and telephony ATM cells with an address programmed into a TDM address register. If the addresses match, then the received ATM cell is a telephony ATM cell and allowed to pass through demultiplexer 160 to TDM RAMs 166 and 168. If the addresses do not match, the received ATM cell is assumed to be a video ATM cell and is thus transferred to video brick 31 through demultiplexer 160. SBI sequence checker 174 checks for appropriate framing of the video and telephony ATM cell data stream from dual SONET physical layer interface 90. If correct framing is not detected, a processor interrupt occurs. Correct framing occurs if at least one bit not more than eight SBI frames are in a 1 KHz superframe.

A write state machine 176 and a read state machine 178 provide address and control signals for TDM RAMS 166 and 168 through a cross-connect 180. Write state machine 176 is enabled through OR gate 169 when a valid TDM macro address is detected at TDM macro address comparator 172, when TDM enabler allows TDM cell processing, and correct framing is detected at SBI sequence checker 174, all indicating that a telephony ATM cell has been received at demultiplexer 160. An address count for write state machine 176 is determined by an unpacked/packed mode detector 182. Packed/unpacked mode detector 182 checks the header of the telephony ATM cells to determine whether the payload contains packed or unpacked information. In an unpacked mode, each telephony ATM cell contains a single frame of telephony traffic (16 words/32 bytes) while in a packed mode each telephony ATM cell contains more than a single frame of telephony traffic (24 words/48 bytes).

Address counting in read state machine 178 is reset every 125 μsec corresponding to each SBI frame. Write state machine 176 is reset by a 1 kHz superframe detector 184 that determines whether the header of the video and telephony ATM cells contain a 1 kHz superframe synchronization signal. The 1 kHz superframe synchronization signal is to insure that eight SBI frames of telephony traffic have been received for proper framing identification. Cross-connect 180 toggles address and control signals between write state machine 176 and read state machine 178 and TDM RAMs 166 and 168.

TDM RAMs 166 and 168 are used to buffer downstream telephony traffic in telephony ATM cells. As information is stored in TDM RAM 166, information is sent out of TDM RAM 168, and vice versa, through dual selector 186 and converted to serial format by a parallel to serial converter 188. A dual selector 190 sends telephony traffic to active or protect circuits of conventional optical network unit 80 over an octal bus. The octal bus carries eight SBI frames to conventional optical network unit 80. Cross-connect 180 performs the appropriate toggling such that information is stored into and read out from the appropriate TDM RAM. For example, as TDM RAM 166 stores eight SBI frames of telephony traffic, TDM RAM 168 sends the previous eight SBI frames worth of telephony traffic to conventional optical network unit 80.

A frame delay unit 192 and a latch 194 allow for telephony traffic to be properly aligned to the downstream 125-microsecond signal frequency. A synchronization delay unit 197 allows for alignment of the telephony traffic to the downstream superframe synchronization. A super frame synchronization signal received from conventional optical network unit 80 at a divide-by-8 unit 195 provides the control for read state machine 178, the toggling of cross-connect 180, and the selection option of dual selector 186. Parity checking of received video and telephony ATM cells is performed by a parity checker 199.

FIG. 5B shows the upstream flow for central processing unit 92. Central processing unit 92 receives telephony traffic from active and protect portions of conventional optical network unit 80 over the octal bus at a selector 200. Selector 200 provides telephony traffic from the working portion of conventional optical network unit 80 to a serial-to-parallel converter 202 that provides parallel data to upstream TDM RAMs 204 and 206. Read state machine 208 and write state machine 210 provide address and control signals for upstream TDM RAMS 204 and 206 through a cross-connect 212. Header information from the downstream telephony ATM cell is stored in a header buffer 216 that determines whether the packed or unpacked mode is desired and the address for TDM macro address comparator 218. The count for the address counter of read state machine 208 is controlled by a packed/unpacked mode detector 214 that determines whether the telephony traffic is to be packed or unpacked into a telephony ATM cell. TDM macro address comparator 218 provides the control signal to enable read state machine 208 if the address in the header of the downstream telephony ATM cell matches the address programmed into a TDM address register of TDM macro address comparator 218. If the address does not match, read state machine 208 is disabled and a selector 220 only allows video ATM cells from video brick 31 to be transferred out to video bank section 18.

Upstream TDM RAMS 204 and 206 are used to buffer upstream telephony traffic. As TDM RAM 204 stores telephony traffic, upstream TDM RAM 206 sends telephony traffic to an ATMizer 222, and vice versa. For example, as TDM RAM 204 stores eight SBI frames of upstream telephony traffic received from conventional optical network unit 80, TDM RAM 206 sends the previous eight SBI frames worth of telephony traffic to ATMizer 222. ATMizer 222 creates a telephony ATM cell by combining telephony TDM data from upstream TDM RAMS 204 and 206, header information from downstream ATM cell header buffer 216, and the current state of the superframe synchronization signal generated by a 1 kHz superframe synchronization delay unit 224. ATMizer 222 places one SBI frame of telephony traffic into an ATM cell for unpacked delivery mode and more than one SBI frame for packed delivery mode. Depending upon the control signal from TDM macro address comparator 218, selector 220 multiplexes telephony ATM cells and video ATM cells for transfer to video bank section 18 through dual SONET physical layer interface 90. Central processing unit 92 receives video broadband ATM cells from video brick 31 through dual SONET physical interface layer 90 for multiplexing with telephony ATM cells.

Synchronization and framing signals for control read state machine 208, write state machine 210, and the toggling of cross-connect 212 are received from conventional optical network unit 80 through a selector 226. A parity checker 228 generates odd parity and compares the results with the parity bits from dual SONET physical layer interface 90 in order to determine the occurrence of parity errors. A parity generator 230 provides two odd parity bits for every 16 bits of data transmitted to dual SONET physical layer interface 90. Central processing unit 92 operates off of a 19.44 MHz synthesizer provided by synthesizer generator 232 in response to oscillator 234 and clocking signals from conventional optical network unit 80 provided by selector 236.

Though shown as separate units, TDM RAMs 166, 168, 204, and 206 may be a single unit or device as well as other units with similar nomenclature in the downstream and upstream flow portions of cell processing unit 92. Further, a more detailed explanation of converting telephony traffic to and from ATM cells can be found in co-pending U.S. patent application Ser. Nos. 60/031,920 and 08/277,103 entitled "Method and Apparatus for Placing Time Division Multiplexed Telephony Traffic Into An Asynchronous Transfer Mode Format", which is hereby incorporated herein by reference.

For optical network unit configuration 20c, a video expansion shelf 200 is included with a conventional telephony optical network unit 202. Optical network unit configuration 20c may operate in two modes. In a first mode, video expansion shelf 200 receives video ATM cells from video bank section 18 and conventional telephony optical network unit 202 receives telephony traffic from telephony bank section 16. In the first mode of operation, video expansion shelf 200 operates similarly to video brick 31. In a second mode of operation, video and telephony ATM cells are received over a fiber optic communication link from video bank section 18 at conventional telephony optical network unit 202. Conventional telephony optical network unit 202 includes an optical line unit similar to full service optical line unit 82 that identifies video ATM cells for routing to video expansion shelf 200 and telephony ATM cells to extract telephony traffic for conventional processing. This second mode of operation operates similarly to optical network unit configuration 20b.

Video expansion shelf 200 of optical network configuration 20c may provide thirty-two broadband video drops for video service provisioning to customers. The main application for video expansion shelf 40 includes video expansion for larger telephony optical network unit configurations and video overlay to existing telephony plant in densely populated areas. Video expansion shelf 40 couples to the home using twisted pair connections.

Figure 6:
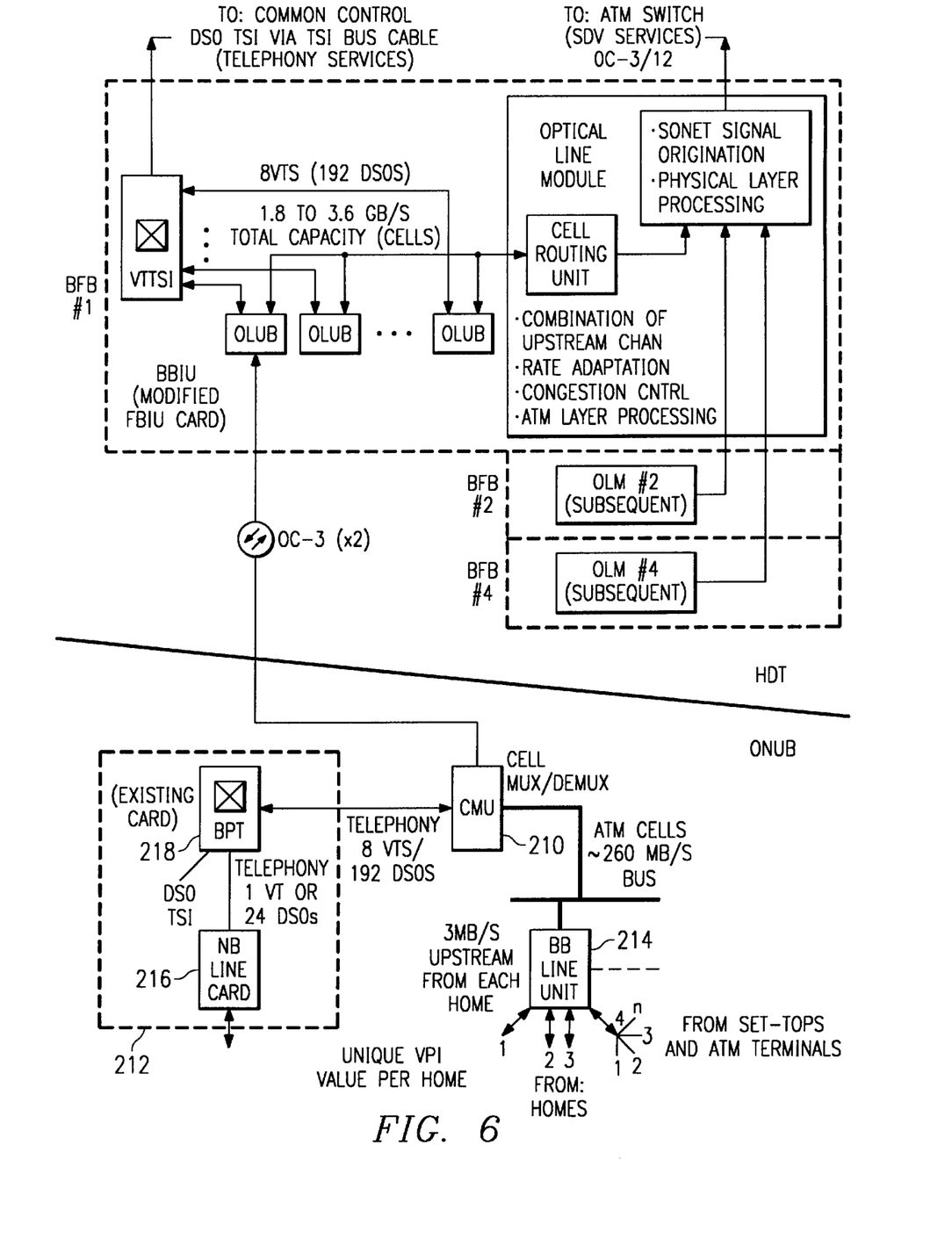
FIG. 6 illustrates a block diagram of an alternate optical network unit configuration.

FIG. 6 is a block diagram of optical network unit configuration 20d integrates all of the functionality of the other optical network unit configurations discussed above into a single device. Optical network unit configuration 20d includes a cell mux/demux unit 210 that identifies telephony ATM cells for routing to a channel unit 212 and video ATM cells for routing to a broadband line unit 214. Cell mux/demux unit 210 also generates telephony ATM cells and video ATM cells, multiplexes them, and transports them to video bank section 18 over the fiber optic communication link. Broadband line unit 214 extracts the video information from the video ATM cells and sends the video information to the appropriate network terminator 24 and set top unit 23. Broadband line unit 214 returns video control information to cell mux/demux unit 210 for transfer to broadband fiber bank 32. Channel unit 212 receives telephony traffic extracted from telephony ATM cells by mux/demux unit 210 and routes the telephony traffic to a narrowband line card 216 through a time slot interchanger 218. Narrowband line card 216 sends telephony traffic to customer premises telephone equipment 26 through network terminator 24. Channel unit 212 also provides telephony traffic for customer premises telephone equipment to cell mux/demux unit 210 for transfer to broadband fiber bank 32.

Figure 7:
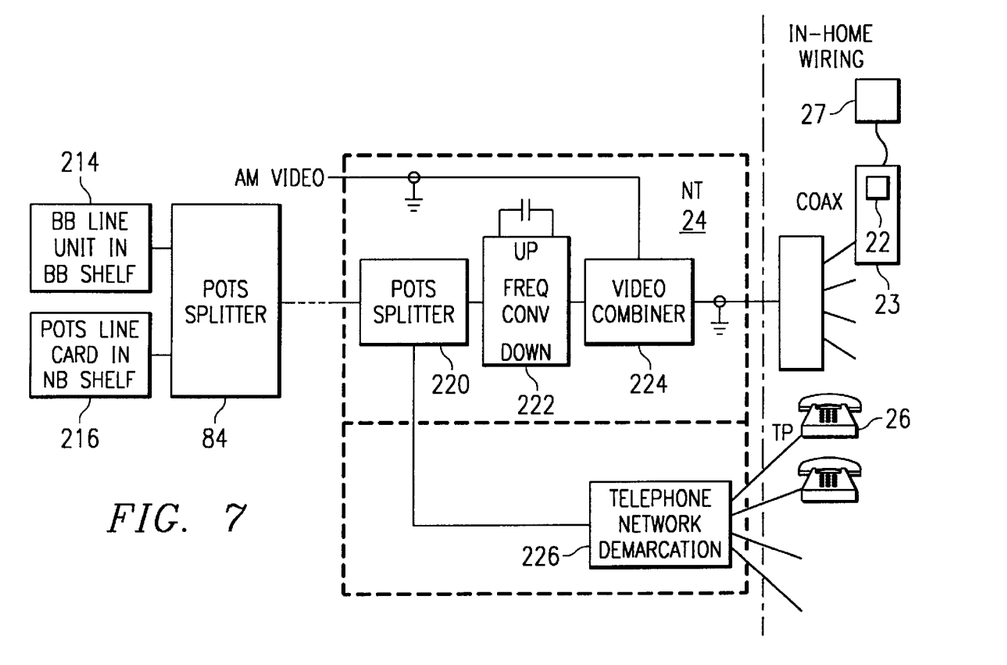
FIG. 7 illustrates a block diagram of a network terminator.

FIG. 7 is a block diagram of network terminator 24. Network terminator 24 may include at POTS splitter 220, a frequency converter 222, a video combiner 224, and a telephone interface 226. For those instances where video information from broadband line unit 214 and telephony traffic from narrowband line card 216 are combined onto a single link by POTS combiner 84, POTS splitter 220 separates the video information and the telephony traffic. Telephony traffic is sent by POTS splitter 220 to telephone interface 226. Video information is sent by POTS splitter 220 to frequency converter 222. For those instances where a POTS combiner 84 and a POTS splitter 220 are not used, frequency converter 222 receives video information directly from broadband line unit 214 and telephony interface 226 receives telephony traffic directly from narrowband line card 216.

Telephone interface 226 provides telephony traffic to and from one or more customer premises telephone equipment 26. Frequency converter 222 provides video information to and from one or more set top units 23 for display on customer premises video equipment 27. Video combiner 224 may combine amplitude modulated video signals received from an antenna with the video information from frequency converter 222. POTS splitter 220 also combines video information with telephony traffic generated by the customer for return transfer to the appropriate optical network unit configuration.

Figure 8:
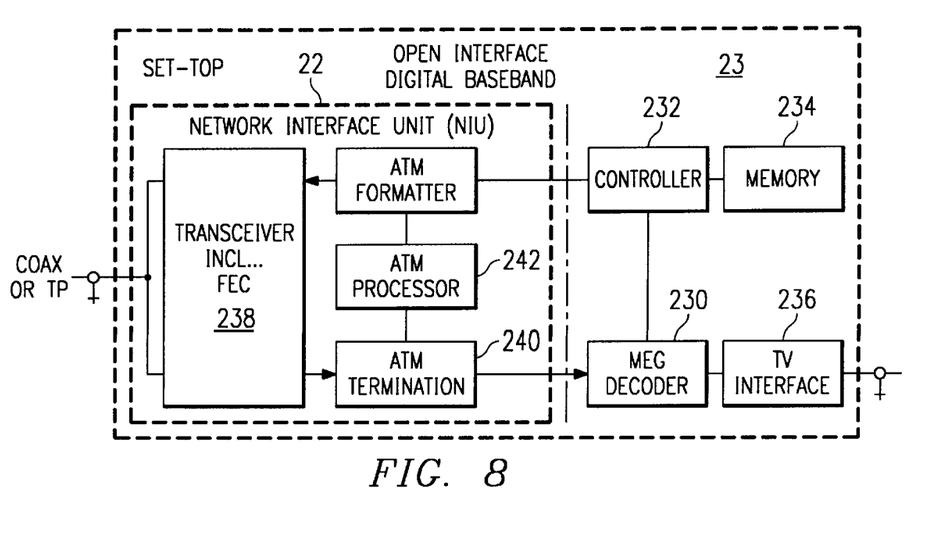
FIG. 8 illustrates a block diagram of a set top unit.

FIG. 8 is a block diagram of set top unit 23. Set top unit 23 includes network interface unit 22, a motion picture experts group (MPEG) decoder 230, a controller 232, a memory 234, and a television interface 236. Network interface unit 22 receives video information from network terminator 24 at a transceiver 238. The video information is terminated by an ATM termination unit 240 under the control of an ATM processor 242. ATM termination unit 240 extracts the video payload of the video information within video ATM cells and provides the video payload to MPEG decoder 230. MPEG decoder 230 places the video payload into a displayable format that is provided to customer premises video equipment 27 through television interface 236. Controller 232, in conjunction with memory 234, provides control information to MPEG decoder 230 for the proper display of the video payload. Controller 232 also provides control information to an ATM formatter 244 for placement into ATM cells under the direction of ATM processor 242. ATM cells containing the control information generated by ATM formatter 244 are sent to the appropriate optical network unit configuration through transceiver 238 for proper routing and processing.

Thus, it is apparent that there has been provided, in accordance with the present invention, an optical network unit for communicating telephony and video information that satisfies the advantages set forth above. Although the present invention has been described in detail, it should be understood that various changes, substitutions, and alterations can be made herein. For example, though video information from a video information provider, the present invention may equally apply to other types of packet data to include information from an information service provider such as an Internet environment. Other examples are readily ascertainable to one skilled in the art and can be made herein without departing from the spirit and scope of the present invention as defined by the following claims.

What is claimed is:

1. An optical line unit, comprising:

a selector unit operable to receive a common transport structure carrying telephony traffic and packet data, the selector unit operable to provide packet data carried in the common transport structure packet data processing section of the optical network unit and provide telephony traffic carried in the common transport structure to a telephony traffic processing section of the optical line unit;

a comparator unit operable to identify telephony traffic carried in the common transport structure, the comparator unit operable to generate a control signal to drive the selector unit in response to identifying telephony traffic carried in the common transport structure;

a write state machine operable to generate write memory addresses, the write memory address operable to extract telephony traffic from the common transport structure in response to the control signal generated by the comparator unit;

a memory operable to store the telephony traffic in response to the write memory addresses generated by the write state machine;

a packed/unpacked mode detector operable to determine an amount of telephony traffic carried in the common transport structure, the packed/unpacked mode detector operable to generate a detector signal to drive the write state machine in extracting telephony traffic from the common transport structure.

2. The optical line unit of claim 1, further comprising:

a read state machine operable to generate read memory addresses, the read memory addresses operable to place the telephony traffic into a telephony transport structure transferred from the memory.

3. The optical line unit of claim 2, further comprising:

a cross connect operable to alternatively provide write and read memory addresses to a first portion of the memory and a second portion of the memory, telephony traffic being written into the first portion of the memory while telephony traffic is being read out of the second portion of the memory.

4. The optical line unit of claim 1, wherein the common transport structure is in an asynchronous transfer mode cell format.

5. The optical line unit of claim 1, wherein packet data includes video information generated by a video information provider.

6. An optical line unit, comprising:

a write state machine operable to generate write memory addresses;

a read state machine operable to generate read memory addresses;

a memory operable to store telephony traffic generated by a subscriber in response to the write memory addresses, the memory operable to transfer telephony traffic in response to the read memory addresses;

a conversion unit operable to place telephony traffic transferred from the memory into a common transport structure;

a multiplexer operable to receive telephony traffic carried in the common transport structure from the conversion unit, the multiplexer operable to receive packet data carried in the common transport structure from the subscriber, the multiplexer operable to integrate telephony traffic and packet data into the common transport structure for transfer over a single communication link;

a cross connect operable to alternatingly provide write and read memory addresses to a first portion of the memory and a second portion of the memory, telephony traffic being written into the first portion of the memory while telephony traffic is being read out of the second portion of the memory.

7. The optical line unit of claim 6, wherein the common transport structure is an asynchronous transfer mode cell format.

* * * * *